Feb. 19, 1935. C. D. PETERSON 1,991,625
INERTIA BRAKE
Filed Sept. 14, 1932
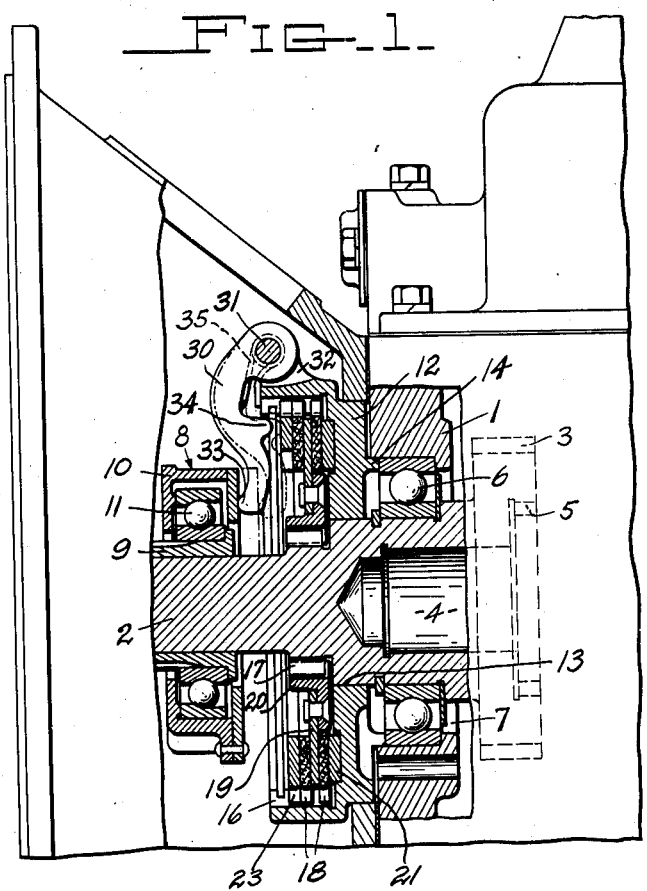
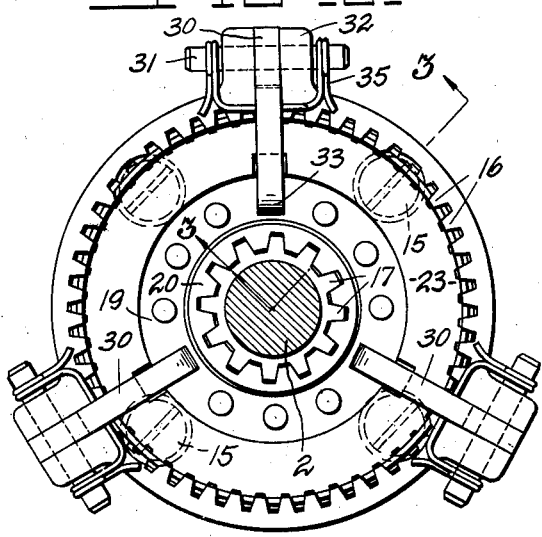
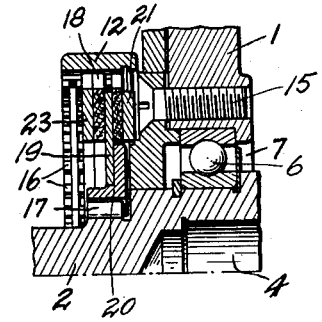
INVENTOR:
Carl D. Peterson,
BY Bodell & Thompson
ATTORNEYS.

Patented Feb. 19, 1935

1,991,625

UNITED STATES PATENT OFFICE 1,991,625

INERTIA BRAKE

Carl D. Peterson, Toledo, Ohio, assignor to Spicer Manufacturing Corporation, Toledo, Ohio, a corporation of Virginia Application September 14, 1932, Serial No. 633,160

8 Claims. (Cl. 192—18)

This invention relates to inertia brakes for transmission gearings, such as are used in motor vehicles, and has for its object an inertia brake operated by the throw-out collar sleeve, or bearing, of the main clutch of a motor vehicle of such construction as to quickly overcome the inertia of the rotating gears and shafts of heavy transmission gearing, such as are used in trucks, busses etc., which inertia brake is powerful, but operated with a minimum effort, and capable of stopping the rotating parts of the gearing quickly when the main clutch is thrown out preliminary to gear shifting operation so that the gears are idle during gear shifts particularly when a so called rear clutch is used.

It further has for its object, an inertia brake operated by the throw-out collar in which the motion of the throw-out collar is transferred to braking elements through multiplying levers.

It further has for its object, a powerful inertia brake which can be assembled within the space available between the front wall of a transmission gear housing and the throw-out collar of the main clutch.

Other objects will appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is a vertical, sectional view through this inertia brake, the contiguous parts of a transmission gearing and the throw-out mechanism of the main clutch, being also shown.

Figure 2 is a face view of parts seen in Figure 1.

Figure 3 is a sectional view on line 3—3, Figure 2.

This inertia brake comprises generally coacting friction members, one of which is fixed from rotation with the drive shaft of the transmission gearing, and the other of which is rotatable with said shaft, and motion transmitting and multiplying levers between the throw-out sleeve or collar of the main clutch and said friction member.

The transmission gearing may be of any well known form, size and construction, and have the usual housing with the shafts and gears therein.

1 designates the front wall of a gear housing.

2 is the drive shaft of the gearing, which is the stem of a gear 3 located in the housing. This gear 3, as will be understood by those skilled in the art, meshes with a gear on the countershaft, not shown, in the housing. The shaft 2 is formed with the usual socket 4 for the pilot bearing of the transmission shaft, not shown, and the gear 3 is formed with an internal clutch face 5 which coacts with a complemental clutch face on a gear element slidable on the transmission shaft. The shaft 2 is mounted in the usual anti-friction bearing 6 located in a bearing opening 7 in the end wall 1 of the gear housing.

8 designates generally, the throw-out collar for the main clutch, this collar moving rearwardly, or to the right Figure 1, when the clutch is disengaged, and being operated by a clutch pedal in the usual manner. This collar may be of any suitable form, size and construction, and includes an inner part or sleeve 9 rotatable on the shaft 2, and an outer part or collar 10 with an anti-friction bearing 11 between them. The throw-out yoke, not shown, coacts with the collar 10, as will be understood by those skilled in the art. The construction of the throw-out mechanism forms no part of this invention.

The inertia brake includes a body 12 detachably mounted on the end wall 1, this being preferably in the form of a drum having a head lying against the end wall 1 and an opening 13 around the shaft 2. It is also formed with an annular hub 14 which extends into the bearing opening 7 to center the body relatively to the shaft. The body is secured in position in any suitable manner, as by screws 15 extending through the head and threading into the end wall 1. The annular, or cylindrical wall of the drum is formed with internal teeth 16, and the shaft 2 is also preferably formed with an external toothed face 17. The friction members are here shown as sets of interleaved disks, one set being interlocked with the drum or with said teeth 16, and the other set with the shaft or the teeth 17.

18 designates the disks which are interlocked with the teeth 16, or the drum 12, and 19 the set which rotates with the shaft 2, this being a single disk mounted on the hub 20 having teeth complemental to the toothed face 17.

21 is an abutment ring seated in an annular recess in the head 12 and overlying the heads of the screws 15.

23 is an outer abutment ring rotatable with the drum and thrusting against one of the disks 18. The disks 18 are preferably of a fibrous material, and the disk 19 of steel.

30 designates one of the motion transmitting and multiplying levers, there being a plurality and preferably, three of such levers. Each lever 30 is pivoted at 31 at its outer end between radially extending lugs 32 on the cylindrical part of the drum and coacts at its inner end at 33 with the throw-out collar 10, each lever having a nose 34 between its ends for thrusting against the abutment ring 23. Each lever is acted upon by a spring 35 tending to press it away from the disk 23.

In operation, when the throw-out collar 10 is moved rearwardly, or to the right, that is, toward the end wall of the gear housing, it engages and depresses the levers 30 causing the levers to compress the disks and hence, stop the rotation of the shafts of the gearing. Owing to the levers 30 comparatively great force can be applied to the disks with a minimum force applied to the throw-out collar 10 from the clutch pedal, so that the inertia of a heavy countershaft and gears is quickly overcome with a minimum effort. Also, the brake can be readily applied to the gear box. Furthermore, owing to the brake construction, the brake is particularly compact and at the same time powerful, and can be placed in a small available space between the gear box and the throw-out collar.

What I claim is:

1. The combination with a transmission gearing including a housing and a drive shaft journalled in the housing and extending through an end wall thereof, and a main clutch throw-out collar shiftable on said shaft; of an inertia brake comprising coacting friction members, one being fixed relatively to said wall and the other rotatable with said shaft, and a lever pivotally connected to said wall and operable by the throw-out collar to engage said friction members.

2. The combination with a transmission gearing including a housing and a drive shaft journalled in the housing and extending through an end wall thereof, and a main clutch throw-out collar shiftable on said shaft; of an inertia brake comprising coacting friction members, one being fixed relatively to said wall and the other rotatable with said shaft, and levers pivotally connected to said wall and operable by the throw-out collar to engage said friction members, said levers extending in radial directions relatively to the shaft and being pivoted at their outer ends and having their inner ends arranged to thrust against the throw-out collar and bearing intermediate of their ends on one of said members.

3. The combination of a transmission gearing including a housing, and a drive shaft journalled in the casing and extending through an end wall thereof, and a main clutch throw-out collar shiftable on said shaft; of an inertia brake comprising a drum on said wall concentric with the shaft, sets of interleaved disks interlocked respectively with the drum and the shaft, means for compressing the disks including levers pivoted to the drum and coacting with said disks and with the throw-out collar.

4. The combination of a transmission gearing including a housing, and a drive shaft journalled in the housing and extending through an end wall thereof, and a main clutch throw-out collar shiftable on said shaft; of an inertia brake comprising a drum on said wall concentric with the shaft, sets of interleaved disks interlocked respectively with the drum and the shaft, means for compressing the disks including levers pivoted to the drum and coacting with said disks and with the throw-out bearing, said levers extending radially relatively to the shaft and being pivoted at their outer ends to the drum and coacting at their inner ends with the throw-out collar.

5. The combination with a transmission gearing including a housing, and a drive shaft journalled in the housing and extending through an end wall thereof, said end wall having a bearing opening for the shaft, and a main clutch throw-out collar shiftable axially of said shaft; of an inertia brake comprising a drum having a head abutting against said end wall, and a hub fitting the annular wall of said bearing opening, sets of interleaved disks slidable axially of the shaft and the drum, one set being interlocked with the annular wall of the drum, and the other with the shaft, and levers pivoted at their outer ends to the drum and thrusting at their inner free ends against the throw-out collar, said levers coacting between their ends with one of said disks.

6. The combination with a transmission gearing including a housing, a drive shaft journalled in the housing and extending through an end wall thereof, said end wall being provided with a bearing opening for the shaft, and a main clutch throw-out collar shiftable axially of the shaft, of an inertia brake comprising a drum mounted on said end wall concentric with the shaft, and said shaft provided with a peripheral toothed face within the drum, sets of interleaved disks, one set being slidably interlocked with the drum, and the other set with said toothed face of the shaft, and levers pivoted at their outer ends to the drum and coacting at their inner ends with said throw-out collar, and between their ends with said disks.

7. The combination with a transmission gearing including a housing, and a drive shaft journalled in the housing and extending through an end wall thereof, a main clutch throw-out collar shiftable on said shaft; of an inertia brake carried entirely by said end wall and the shaft and including coacting friction members and motion transmitting and multiplying levers for engaging them, arranged in the path of the throw-out collar.

8. The combination with a transmission gearing including a housing, and a drive shaft journalled in the housing and extending through an end wall thereof, a main clutch throw-out collar shiftable on said shaft; of an inertia brake carried entirely by said end wall and the shaft and including interleaved brake disks and motion transmitting and multiplying levers for compressing the disks arranged in the path of the throw-out collar.

CARL D. PETERSON.